Patented Apr. 19, 1927.

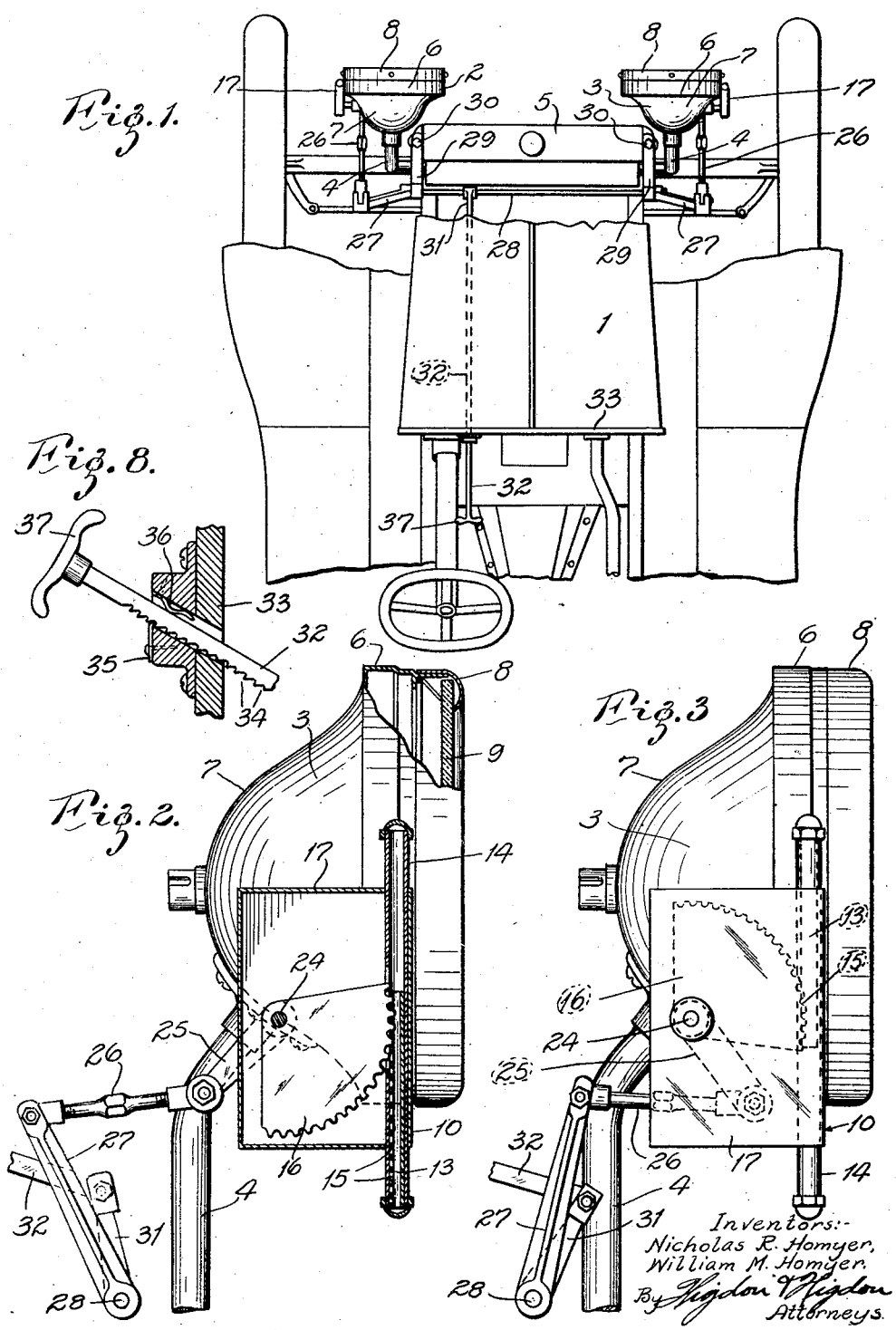

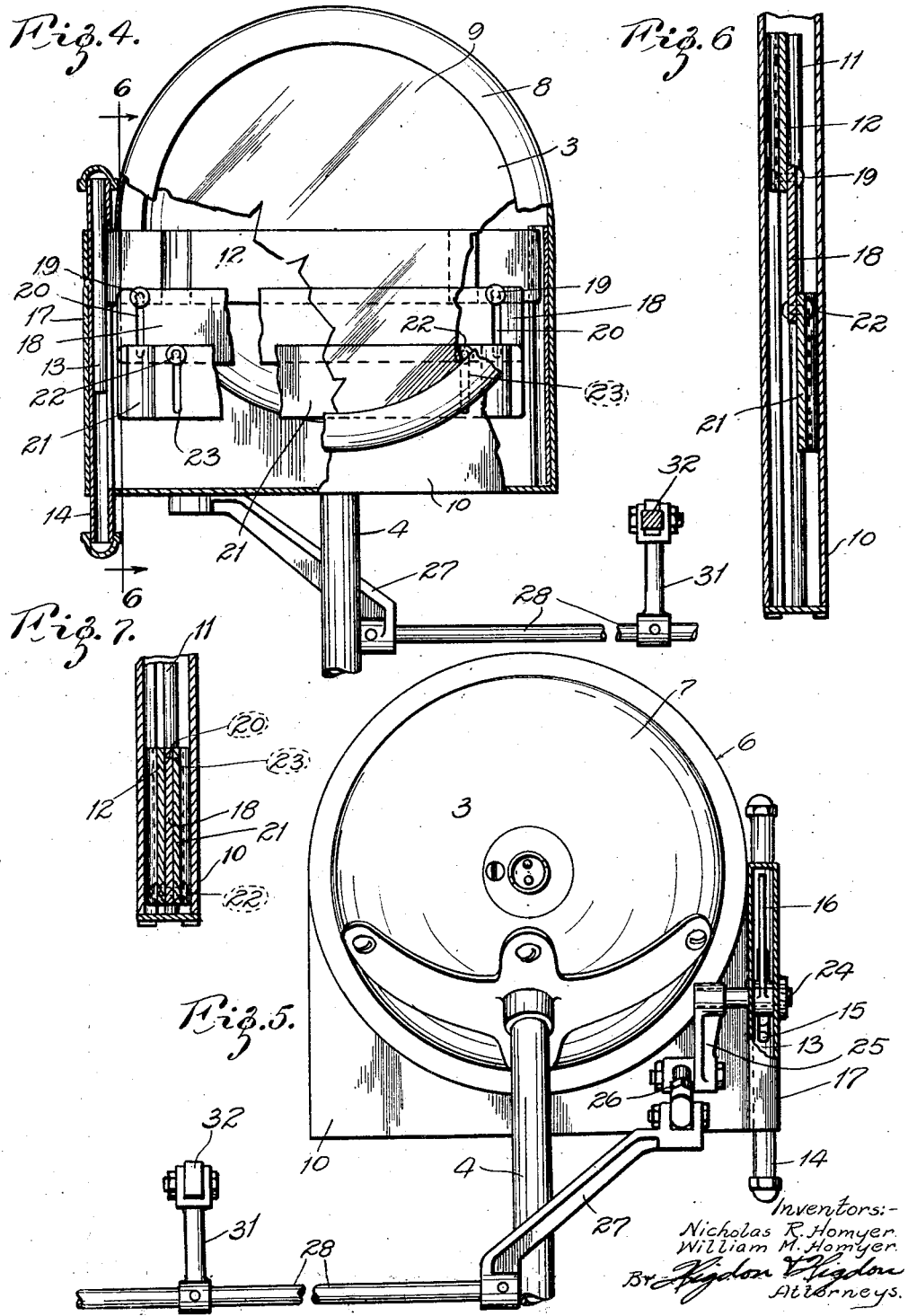

1,625,660

UNITED STATES PATENT OFFICE.

NICHOLAS R. HOMYER AND WILLIAM M. HOMYER, OF GRANITE CITY, ILLINOIS.

GLARE DEFLECTOR FOR HEADLIGHTS.

Application filed December 14, 1925. Serial No. 75,329.

Our invention consists in the novel construction, combination and arrangement of parts hereinafter particularly described and distinctly claimed.

The object of our invention is to provide a device commonly known as a glare deflector for headlights of any nature, but in the present instance is shown in use in connection with a pair of automobile headlights, and which device will, when installed upon an automobile, eliminate the blinding glare of strong automobile headlights from shining into the eyes of approaching motorists, or pedestrians, and at the same time supply sufficient rays of light to enable the driver of the automobile or truck carrying our invention, to clearly see the roadway while the invention is being used as a glare deflector.

The device is designed to shut-off the light that shines from the bottom portion of the headlight reflectors, and to permit the rays of light that shine from the top portion of the reflectors to shine on the roadway when the device is used as a deflector, and to permit the full rays to shine on the roadway when the device is not in use, and the device is so constructed as to be simple, durable in operation and of low cost to manufacture.

In the drawings:—

Fig. 1 is a top plan-view of a part of the front end of an automobile having our invention applied to the headlights thereof.

Fig. 2 is a side-elevation of a headlight having our invention attached thereto, several of the parts of the invention being shown in section so as to illustrate how the invention is used.

Fig. 3 is a view similar to that of Fig. 2.

Fig. 4 is a front end-view of a headlight having our invention in place thereon, showing the glare deflecting-shutters in operating position.

Fig. 5 is a rear view of an automobile headlight showing several of the working parts necessary for operating the glare deflecting-shutters.

Fig. 6 is a sectional side elevation of a tube and casing in which the said glare deflecting shutters operate, said shutters being in operating position.

Fig. 7 is a sectional side elevation of the tube and casing showing the glare deflecting-shutters as they appear when not in use, and Fig. 8 is a detail view of the arrangement of a lever used for operating the glare deflecting-shutters from the seat of the automobile; the lever being operated from the dash, or instrument board.

Referring now to the accompanying drawings in which we have shown the preferred embodiment of our invention, which will now be described, the numeral 1 designates an automobile having our invention applied to the lamps thereof, the numeral 2 designating the lamp on the left side of the automobile, and the numeral 3 designating the lamp on the right side of the automobile.

The numeral 4 designates the usual lamp brackets which support the said lamps upon the automobile, while the numeral 5 designates the radiator of the automobile.

The numeral 6 designates a ring that is adapted to fit around the cup-shaped lamp-casing 7 upon which the usual finishing rim 8 is mounted; the latter being removed when our invention is to be placed in position on the lamps, and is attached to the forward edge of the said ring 6 after our invention has been placed in operating position on the said lamps.

The said finishing ring 8 is used to hold the usual lens 9 into position on the lamp in the same manner as usual, only that the said lens is moved a slight distance away from the reflector of the lamp after our invention is applied.

Secured to the said ring 6, on the underside thereof, is a casing 10 having a slotted tube 11 secured to the interior wall thereof, at one of its ends; said tube 11 being slotted to receive the free end of one of a plurality of shutter-blades 12, that are adapted to slide upwardly and downwardly in said slotted tube; the opposite end of said shutter-blades being secured to a rack-tube 13 that is encased in a larger split or slotted tube 14.

Said tubular-rack 13 is slidably mounted within the said split tube 14; the latter being of much greater length than that of the said tubular-rack 13 in order to permit the said rack 13 to slide upwardly and downwardly therein freely.

The said tubular-rack 13 is provided with small slots 15 which form teeth which are adapted to engage the teeth of a sector-gear 16 that is concealed from view by being encased in a casing 17 which is also secured to the said ring 6, and the said casing 10 by means of the said split-tube 14.

The numeral 18 designates a shorter glare deflecting-shutter that is slidably mounted to the lower edge of the said deflecting-shutter 12 by means of rivets or studs 19 extending through slots 20 cut in the said shutter 18 adjacent the ends thereof, and the numeral 21 designates a still shorter glare deflecting-shutter that is slidably mounted to the lower edge of the said glare deflecting-shutter 18 by means of rivets or studs 22 extending through slots 23 cut in the said glare deflecting-shutter 21 adjacent the outer ends thereof.

The numeral 24 designates a shaft upon which the said sector-gear 16 is mounted and the numeral 25 designates a short lever having one of its ends mounted upon the free end of the said shaft 24.

The numeral 26 designates a connecting-bolt having screw-threads at both ends, and is used to connect the said lever 25 to a crank-arm 27, the lower end of which is connected to a horizontal bar or rod 28.

Said horizontal bar or rod 28 is held in position in the rear of the radiator 5 by means of bearings 29 that are held in position by the usual radiator nuts 30.

The numeral 31 designates a crank-arm that is mounted upon the said horizontal bar 28, adjacent one of its ends, and is adapted to receive a rod 32 that extends rearwardly on an incline upwardly from the said horizontal bar or rod 28, to and through a hole formed in the dash or instrument board 33 of the automobile, and is provided with teeth 34 which act as a ratchet when said teeth engage the sharp edge of a steel-plate 35 that is secured to the said dash or instrument-board 33.

A spring 36 is secured to the inner wall of said hole in said dash or instrument-board 33 and bears against the top of said rod or bar 32, holding the latter against the said steel-plate 35 at all times.

Said rod or bar 32 is provided with a T-shaped handle 37 that is to be grasped by the operator's hand when it is desired to dim the lights of the automobile.

The operation of our invention is as follows:—

After our invention has been installed on an automobile, and should the driver find it necessary to dim his headlights, he grasps the handle 37 and pushes it forward causing the rod 32 to move the sector gear 16, the teeth of the latter meshing with the slots 15 that are formed in the tubular rack 13 to which is connected the shutter blade 12.

The movement of the sector gear 16 forces the said shutter blade 12 upwardly and as the said shutter-blades 18 and 21 are slidably mounted upon one another, they unfold as the said shutter blade 12 continues upwardly until the rivets or studs 19 and 22 have reached the lower ends of the slots 20 and 23 formed in said shutter blades 18 and 21.

This operation brings the shutter blades 12, 18 and 21 in the position as shown in Figs. 4 and 6 in the drawings, while a reverse of the movements above described brings the shutter blades shown in Fig. 7 of the drawings.

While we have illustrated certain details of construction which we deemed to be particularly effective, and very cheap to make and be assembled, we do not wish to be limited to these details, as it is obvious that many changes might be made therein without departing from the spirit or scope of our invention.

Having thus described our invention, what we claim as new and desire to secure by Letters-Patent is:—

1. In a device of the character described, the combination of an automobile having a pair of headlights, of a metal ring adapted to fit around the cup-shaped lamp-casing, a casing secured to the lower portion of the said metal ring; slotted tube secured to the inner wall of said casing, at one end thereof, and a shutter-blade adapted to slide upwardly and downwardly in the slot in said tube, as and for the purpose set forth.

2. In a device of the character described, the combination of an automobile having a pair of headlights, of a casing mounted to one side of said headlights and secured to a metal ring, a tubular-rack mounted to slide upwardly and downwardly within a slotted tube mounted at one end of the said casing above mentioned; slots which form teeth that are adapted to mesh with the teeth of a sector gear mounted within said casing, and means for imparting motion and action to the said sector gear, as and for the purpose set forth.

3. In a device of the character described, the combination of an automobile having a pair of headlights, of a casing mounted to one side of said headlights and secured to a metal ring, a tubular rack mounted to slide upwardly and downwardly within a slotted tube mounted at one end of the said casing above mentioned; of a shutter-blade secured to said tubular rack and adapted to slide upwardly and downwardly within said slot in said slotted tube; of additional shutter-blades slidably mounted to the lower edge of the above mentioned shutter-blade, of a sector-gear mounted upon a shaft, a crank-arm mounted upon said shaft; another crank-arm being connected to the first mentioned crank-arm by means of a connecting bolt; a horizontal bar connected to the lower free end of the last mentioned crank-arm; brackets secured to the radiator of the automobile to hold the said horizontal bar in position; a crank-arm mounted on the end of said horizontal-bar; a rod provided with ratchet-teeth secured to the said last mentioned crank-arm, the teeth of said rod being adapted to engage the edge of a steel plate secured to the dash or instrument board of the automobile; a spring for forcing said ratchet-teeth of said rod into contact with said steel-plate, and a handle secured upon the free end of said rod, as and for the purpose set forth.

In testimony whereof, we have signed our names to this specification.

NICHOLAS R. HOMYER.
WILLIAM M. HOMYER.